United States Patent [19]

Spero

[11] 4,220,376
[45] Sep. 2, 1980

[54] PRESSURE EQUALIZING AND STABILIZATION DEVICE FOR HYDRAULIC BRAKE SYSTEMS

[76] Inventor: Theodore P. Spero, 1751 Ellis St., Apt. 106, Concord, Calif. 94520

[21] Appl. No.: 419,643

[22] Filed: Nov. 28, 1973

Related U.S. Application Data

[63] Continuation of Ser. No. 306,585, Nov. 15, 1972, abandoned.

[51] Int. Cl.$^2$ ............................................ B60T 17/00
[52] U.S. Cl. ...................................... 303/87; 138/31; 138/46
[58] Field of Search ................. 303/87; 188/268, 266; 267/35; 138/46, 44, 45, 31, 30; 137/593

[56] References Cited

U.S. PATENT DOCUMENTS

| | | | |
|---|---|---|---|
| 2,236,013 | 3/1941 | Smith | 138/46 |
| 3,106,226 | 10/1963 | Machen | 138/45 |
| 3,430,660 | 3/1969 | Mitton | 303/87 X |
| 3,451,431 | 6/1969 | Roger | 138/46 |
| 3,757,825 | 9/1973 | Givens et al. | 303/87 X |

FOREIGN PATENT DOCUMENTS 1040403  8/1966  United Kingdom ...................... 303/87

Primary Examiner—Douglas C. Butler
Attorney, Agent, or Firm—Robert W. Keller

[57] ABSTRACT

A pressure stabilization and equalization device to prevent single wheel lock-up in hydraulic brake systems comprises a housing with openings adapted for connection to a hydraulic line between a power source and a pair of brake actuators. The openings communicate with a fluid receiving first chamber within the housing containing the exposed end face of a freely movable piston axially aligned with a shock absorbing, resiliently yieldable member that extends axially into but does not fill a second chamber formed by the housing. Hydraulic shock waves of increased pressure which occur within the first chamber because of an imbalance reaction from one of the brake actuators as the brakes are applied in a vehicle, are absorbed and damped out by movement of the piston against the resiliently, yieldable member which temporarily deforms within its chamber of the housing.

10 Claims, 5 Drawing Figures

U.S. Patent  Sep. 2, 1980  4,220,376
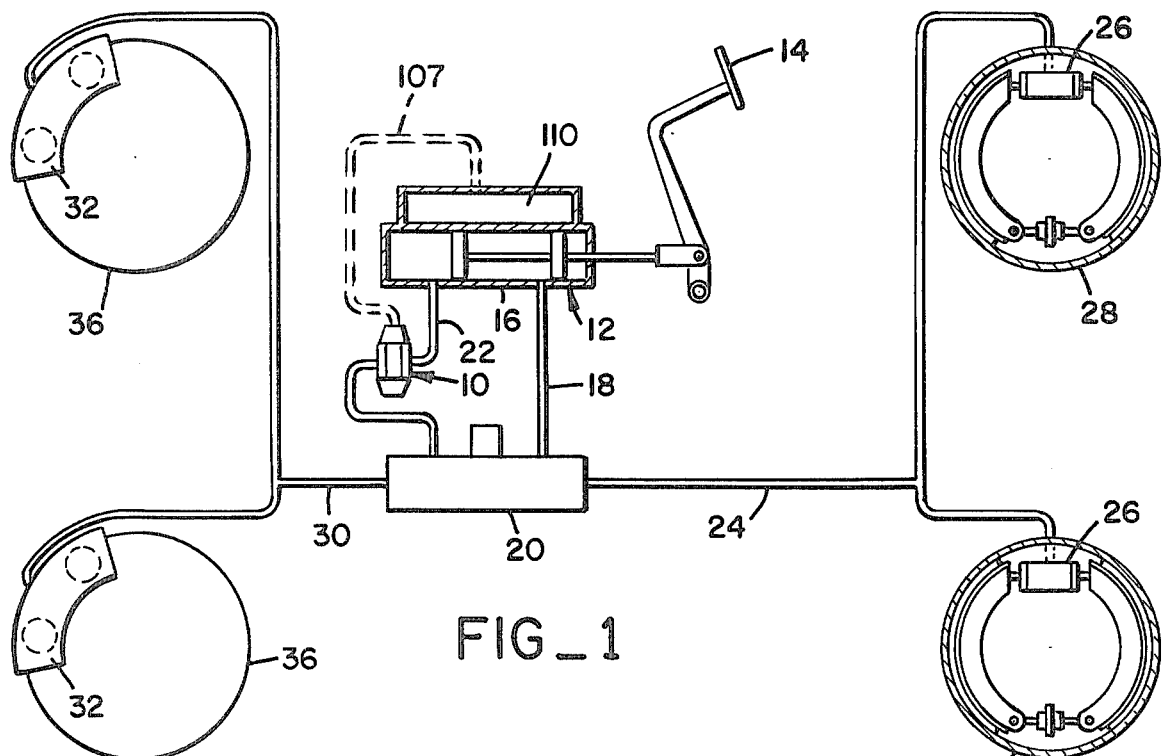
FIG_1
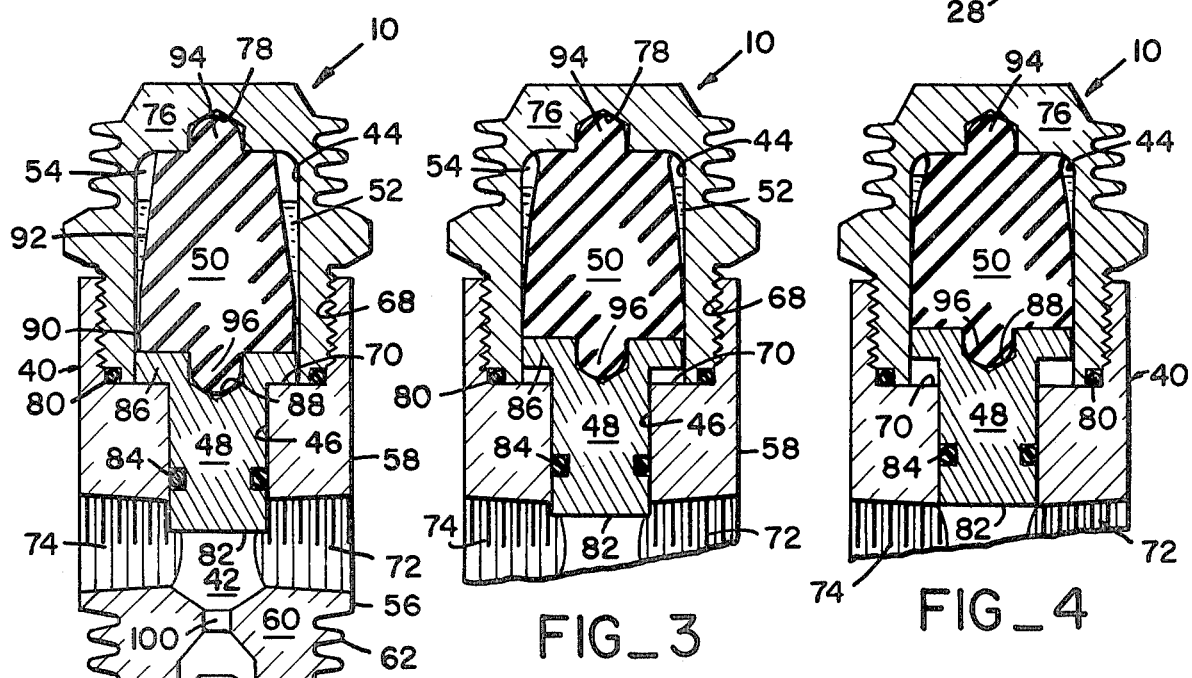
FIG_2  FIG_3  FIG_4
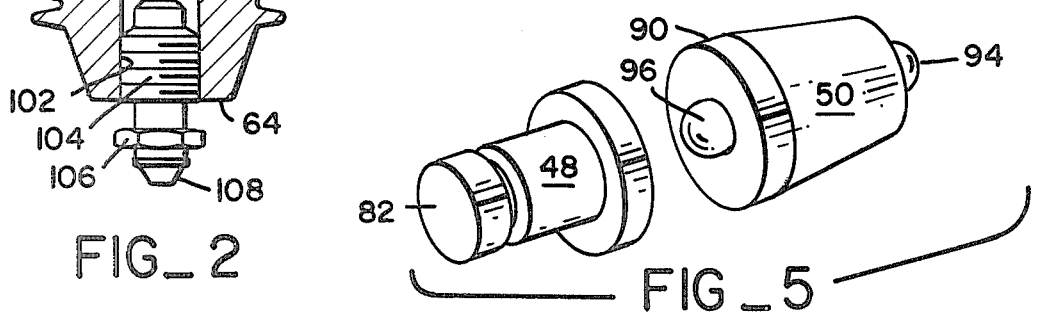
FIG_5

PRESSURE EQUALIZING AND STABILIZATION DEVICE FOR HYDRAULIC BRAKE SYSTEMS

This is a continuation of application Ser. No. 306,585 filed Nov. 15, 1972, now abandoned.

FIELD OF THE INVENTION

This invention relates to systems actuated by fluid pressure and more particularly to an improved device for equalizing pressure variations and damping of stabilizing shock waves or pressure surges produced by one of a pair of actuators that is supplied with fluid under pressure from a single power source. It relates particularly to such a device in a hydraulic brake system for vehicles.

BACKGROUND OF THE INVENTION

In hydraulic actuating systems the operation of one of a pair or group of actuators may be interrupted by a resistance factor which will either stop or temporarily delay its function while the other actuator of the system proceeds to operate normally. This can cause erratic or uneven operation of the apparatus or in some cases a complete malfunctioning. For example, in automobile braking systems using drum type brakes, each drum is actually an imperfect "out-of-round" circle and has a so-called "high-spot". With disc type brakes, the discs of any two wheels can never be identical and they have "high" spots or slight warpage areas that create variations in characteristics. Consequently, when the brakes of a vehicle are applied the braking members pass over all high spots until the drum or wheel disc ultimately stops with one member at the high spot. Since the location and degree of the high spots on any given pair of brake assemblies must be inherently different, the brake member on one wheel, when applied with unusual force as in emergency situations, will tend to "lock-up" before the other wheel, thereby causing the automobile to swerve dangerously or skid to one side. As this "lock-up" condition is about to occur in any hydraulic brake system, a shock wave of increased pressure reverberates along the hydraulic lines. However, if the shock wave and its over-pressure can be absorbed, eliminated or equalized between the front wheels, the lock-up will not occur, and the dangerous results therefrom can be avoided.

Various attempts have been made by skilled workers in the field to solve this "lock-up" problem caused by the effects of unequal resistance forces and shock factors in hydraulic brake systems. One example was embodied in U.S. Pat. No. 3,430,660. However, the performance and efficiency of the device described in the aforesaid patent proved to be substantially limited. For example, it utilized a hollow distortable and shock absorbing bulk member having a central recess open at one end with the bulb being retained in a cavity having bulging sidewalls. Access to the recess of this bulb member was through a relatively small orifice, so that air tended to get trapped within the bulb recess, thereby causing it to react sluggishly. I discovered that one major difficulty with this and other similar prior art devices was that the fluid pressure variations were not applied uniformly to the shock absorbing member. Therefore, the response could not be sufficiently sensitive, repetitive and effective in all cases to produce the desired results. The present invention solves this problem.

It is therefore one object of the present invention to provide an improved pressure equalizing and shock absorbing device for fluid pressure systems that provides improved operating effectiveness and solves the aforesaid problems of prior art devices.

A more specific object of the present ivention is to provide a hydraulic pressure equalizing device comprising a pair of first and second chambers separated by a sealed movable piston which bears against and cooperates with a yieldable member within the second chamber and which will operate so that when the first chamber is placed in a hydraulic line extending from a pressure source which is common to two actuators, the piston will act against the member to absorb feedback pressure surges or shock waves from one of the actuators and thereby prevent pressure at one of the actuators from building up to the point where it locks before the other actuator.

Another object of the present invention is to provide a hydraulic pressure equalizing device that is particularly adaptable for use in hydraulic brake systems for vehicles utilizing either drum or disc type brakes.

Another object of my invention is to provide an improved hydraulic pressure equalizing device for automatic brake systems that is highly sensitive and will prevent "lock-up" of either one of a pair of brakes on wheels of all types of vehicles including light, medium and heavy cars and trucks.

Another object of the present invention is to provide a hydraulic pressure equalizing device that will dissipate heat and can be installed in a wide variety of locations even near high heat producing components without affecting its operative efficiency.

BRIEF SUMMARY OF THE INVENTION

The foregoing objectives are accomplished by a device that may be connected in a fluid pressure system at some convenient location between the source of fluid pressure and a pair of actuators whose pressure must be equalized to provide smooth, safe operation of the apparatus. Generally, it includes a housing that forms a first chamber at one end and a second chamber at its opposite end between which is a bore that retains an axially movable piston aligned with and bearing against a solid but resiliently yieldable shock absorber member. This yieldable member has a frusto-conical shape and is held firmly in alignment with the piston within the second chamber which is generally cylindrical. Its larger end bears against the end of the piston and surrounding its smaller end is a quantity of fluid and an air space into which the yieldable member can distend when acted upon by the piston. On opposite sides of the first chamber are threaded openings to facilitate connection of the device in a hydraulic pressure liner and directly opposite from one end surface of the piston is a normally closed valve that can be opened manually to bleed air from the brake system. When installed in a hydraulic brake system, the aforesaid end face of the piston is directly in contact with the hydraulic fluid under pressure. When the brakes are applied normally, pulsations created in the brake hydraulic lines by the out of round drums or by warped wheel discs acting on their respective brake members create increased pressure and shock waves that are transmitted to the first chamber. This fluid pressure within the first chamber produces a force on the piston which in turn bears directly against and evenly applies the same axial force to the lower end surface of the resilient shock absorber member. These pressure surges come rapidly to the first chamber at a rate controlled by rate of wheel rotation and at a magnitude controlled by the brake pressure applied. With each cycle a distortion or distention of the resilient shock absorber is caused. Thus, the resiliently distensible shock absorber member deforms so as to allow movement of the sealed piston, thereby creating extra space within the first chamber which reduces the hydraulic line pressure and prevents it from reaching or maintaining the "lock-up" level.

Other objects, advantages and features of my invention will become apparent from the following detailed description taken in conjunction with the accompanying drawings.

BRIEF DESCRIPTION OF THE DRAWINGS

FIG. 1 is a schematic diagram of a typical braking system utilizing a pressure equalizing device embodying the principles of my invention;

FIG. 2 is an enlarged view in elevation and in cross section of my pressure equalizing device;

FIG. 3 is a fragmentary view in section similar to FIG. 2 which illustrates the device when it is in operation with an increased pressure in the first chamber;

FIG. 4 is a fragmentary view in section similar to FIG. 3 but showing the piston and yieldable member in their approximate positions when the device is operating at maximum pressure; and FIG. 5 is an exploded view in perspective showing the sealed piston and the resilient shock absorbing member removed from the housing.

DESCRIPTION OF PREFERRED EMBODIMENT

In FIG. 1 a typical automobile brake system is schematically shown utilizing a pressure equalizing or stabilizing device 10 according to the present invention. It comprises a central hydraulic power source 12 such as the master brake assembly of an automobile brake system operated by a foot pedal 14 and having a double piston cylinder 16 that operates to control the front and rear wheel brakes. The rear cylinder has an output line 18 that extends directly to a check valve 20 and the front cylinder has a similar output line 22 that extends to the pressure equalizing device 10 and from the device 10 to the check valve 20. A line 24 extends from the check valve and branches to actuators 26 on each of the two rear wheel brake drums 28. A separate line 30 extends from the check valve 20 and branches to a pair of actuators 32 that are connected to brake on the front wheel disc 36. The purpose of the check valve 20 which is shown merely to depict a modern automobile brake system, is to prevent the loss of hydraulic pressure for both front and rear brakes if a leak should occur in either the front or rear lines 30 or 24. The check valve and brake actuators are not shown in detail since they may be standard components. The brake device on each wheel may be either the drum of disc type but in modern cars the front wheels are usually disc type brakes, as shown. It should be understood, however, that my invention is equally applicable to either drum or disc brakes.

The equalizing device 10 is normally operative for only the two front wheels because in hard braking situations a large percentage of the car's weight shifts to the front wheels, and the rear wheels merely provide a dragging force that has only a minor influence on directional control. However, the front wheels are critical to vehicle control and cannot for one instant "lock-up" at different times or brake unevenly, because to do so causes an immediate loss of directional control. In the typical system illustrated in FIG. 1, it is important to note that hydraulic fluid completely fills the front line from the front brake actuators through the check valve 20 and through the equalizing device to the master cylinder 16. Thus, in normal use, the hydraulic lines 18, 22, 24 and 30 are full of fluid and hydraulic pressure waves or shock waves are transmitted along them rapidly from the actuators to the master cylinder and consequently through the device 10.

In broad terms, the equalizing device 10 comprises a housing 40 that forms a first chamber 42 having an inlet and an outlet allowing for the through passage of hydraulic fluid under pressure and a second chamber 44 that is completely confined. Extending between these two cylinders is a bore 46 and movable within this bore is a free piston 48 having one end located within the first chamber and an opposite end that bears against a resiliently yieldable or distensible shock absorbing member 50 that extends into the second chamber. Assfluid pressure increases within the first chamber the piston moves against the shock absorbing member with an evenly distributed force causing it to deform within the second chamber that contains a confined quantity of liquid 52 and air 54. Deformation or distention of the shock absorbing member causes a movement of the piston that controls the fluid pressure in the first chamber as will be described below.

As shown in detail in FIG. 2, the housing 40 of the pressure equalizing device 10 comprises a main body 56 made of a rigid, durable material, preferably metal and having a generally cylindrical configuration. Preferably it has an exterior hexagonal portion 58 between its ends and axially adjacent this hexagonal portion is a smaller integral portion 60 provided with a series of spaced apart relatively thin fin members 62 that serve to dissipate heat from the device. From the outermost fin member the housing body 56 tapers to a smaller diameter at a transverse end face 64 and at its opposite end it has a relatively large bore 68 with internal threads. This bore is concentric with but larger than the bore 46 and terminates at an internal annular shoulder 70. Accordingly, the interior of the housing 40 forms a cavity. Extending radially inwardly into the first chamber from opposite sides of the hexagonal portion are a pair of inlet and outlet ports 72 and 74, each preferably provided with pipe threads so the tubular hydraulic lines 22 can be readily connected to the device without requiring any fitting, tube or the like that would extend within and utilize space within the first chamber.

Threadedly secured in the bore 68 of the main body 56 is a cup-like member 76 having a generally cylindrical cavity forming the second chamber 44. A smaller recess 78 concentric with this cavity is provided at its closed end. This cup-like member has an external hexagonal nut body portion with adjacent external threads extending axially therefrom which fit those of the bore 68 of the main body. At its annular end face is a notched out end groove for retaining an O-ring 80 which is held against the shoulder 70 when the main body and the cup-like member are assembled. Adjacent the hexagonal nut body portion the member 76 has a series of cooling fins 70 similar to the fins 62.

As shown in FIG. 2, the piston 48 fits within the cylindrical bore 46 so that its end face 82 is exposed within or forms a sidewall of the first chamber 42 between its inlet and outlet ports 72 and 74. This piston has an annular groove spaced from its end face within which is seated an annular sealing member 84 such as a conventional O-ring. At its inner end, the piston has a flange portion 86 having a diameter that provides a close sliding fit with the second chamber 44. Centrally located within the end face of this flange portion is a recess 88 similar to the recess 78 in the closed end of the member 76. Retained by the piston within the second chamber 44 is the solid but resiliently yieldable member 50 that cooperates within the piston to provide the shock absorbing and pressure equalizing functions of the device 10. This yieldable shock absorbing member is preferably molded from a rubber-like elastomeric material such as neoprene having a hardness of around 65 "Shores". Generally, it has a cylindrical end portion 90 from which extends an integral frusto-conical body portion 92 that tapers to a smaller end. An integral knob-like projection 94 extends from its smaller end face and fits within the recess 78. A similar projection 96 at its other end fits within a concentric recess 98 in the end face of the piston. These projections 94 and 96 maintain the member 50 in a centrally oriented position within the second chamber 44, thereby assuring that a uniform amount of space will surround the frusto-conical body portion 92 of the member 50. Within this space is the quantity of liquid 52 such as a light oil or hydraulic fluid and an approximately equal amount of the air or inert gas 54 at atmospheric or slightly greater pressure that provides sufficient space to accommodate a limited amount of distention of the yieldable member 50. In a typical device 10 for use on a passenger vehicle brake system the amount of space provided for the air or gas 54 would be enough to allow a maximum travel of about 0.25 to 0.38 inches of the piston. As shown in FIG. 1, in a normal installation the device is mounted in an upright position so that the air or gas 54 is above the fluid 52. When the piston moves against the solid but yieldable member 50, the latter will first distend about its cylindrical end and seal against the walls of the second chamber 44, pushing the liquid 52 upwardly. Once this seal is established, further travel of the piston will cause further distention and also a compression of the gas 54.

Extending from the first chamber 42 is a passage 100 connected to another threaded bore 102 having a somewhat larger diameter. Seated within this latter bore is an adjustable rotatable valve member 104 of the well-known type. Normally, this valve is locked in the closed position, but by loosening an external nut 106 it can be rotated to an open position to facilitate the release of any air bubbles trapped in the first chamber. If a piece of clear plastic tubing 107 (shown dotted in FIG. 1) is attached to a conical end portion 108 on the valve member 102, the other end of the tubing can be placed in the reservoir 118 of the master cylinder and any air bubbles trapped in the brake system can then be forced into the device 10 and then bled out of it through the valve 102. These bubbles can then be observed in the tubing as they are removed from the system and the bleeding process can be continued until only hydraulic fluid is flowing back to the reservoir.

When installed in a brake system of a vehicle as shown in FIG. 1, the device 10 operates to absorb shock and equalize pressure surges and thereby prevent a "lock-up" of either one of the front wheels even when the brakes are applied with maximum force. With all air properly removed from the system, the first chamber 42 is unobstructed and completely filled with hydraulic fluid. When a shock wave or pressure surge is transmitted through the fluid as when a brake shoe passes over the "high spot" of its adjacent drum or a disc brake element passes over a high or warped spot on a brake disc a shock wave or pressure wave is created within the hydraulic line to that particular brake and consequently pressure within the chamber 42 increases rapidly. Thus, within chamber 42 this pressure provides a force against the end face of the piston 48, and in response to this force the piston bears against the larger end of the frusto-conical resiliently yieldable member 50. As the member yields and the piston moves axially, the pressure buildup within the chamber 42 is counteracted and is thereby reduced back at the brake which normally would tend to "lock-up". Thus, in its general operation the device 10 prevents a buildup and maintenance of excessive hydraulic pressure on one of a pair of actuators such as a brake which would tend to lock-up. Movement of the piston against the yieldable diaphragm 50 causes it to distend or deform into the space 98 surrounding its tapered end. After the piston has moved a short initial axial distance, the yieldable member deforms in a predictable manner in a generally linear relationship proportional to pressure in the chamber. Near its larger cylindrical end 90 the member 50 bulges radially outwardly, as shown in FIG. 3, until it presses against the wall of the chamber and forms a liquid seal therewith. At this point, the annular space 98 surrounding the member 50 containing oil and air becomes completely confined and thereafter as the piston moves further the member continues to distend a greater amount while causing a fairly rapid rise in pressure in the surrounding trapped air. When the air pressure in the surrounding space 98 builds up to the level that equals that of the chamber 42, the piston has reached its maximum point of travel, as shown in FIG. 4. This may occur at a pressure of 1200–1400 psi. in a typical vehicle brake system, a level that is well above that at which normal brake lockups occur. As the pressure surges occur in the first chamber 42, the combination of the piston in cooperation with the solid diaphragm member provides a pressure equalizing device that is highly sensitive and will react rapidly and positively to all pressure changes. Essentially, the piston 48 makes it possible to apply an even, uniformly distributed force to the yieldable member 50 while preventing any fluid leakage between the first and second chamber. The action of the yieldable member is controllably predictable and repeatable over millions of cycles to precisely the degree of resiliency required and no appreciable hysteresis or erratic distention of the member 50 can occur to prevent proper operation of its pressure equalizing function. Thus, in use, a smooth even braking action is assured on both front wheels by the device 10 even when the brakes are applied with normally excessive force at a relatively high speed. Moreover, no "lock-up" of one front wheel brake can occur because when a significant pressure rise or shock in the hydraulic fluid starts to take place, the piston 48 and yieldable member 50 cooperatetto immediately relieve or absorb pressure or shock waves and thereby prevent the ultimate lock-up pressure level from being reached.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A pressure equalizing and shock absorbing device for use in a fluid pressure system including a central power source coupled to a pair of actuators, comprising:

a walled housing having an inner surface forming an elongated cavity having a first port for connection to said power source and a second port for connection to said pair of actuators;

means disposed in said cavity to form a first chamber communicating with said first and second ports, and a second chamber, said means including a rigid piston having a first end exposed to said first chamber and a second end, and an elongated resiliently yieldable, shock absorbing member disposed within said cavity between said second end and an opposite wall of said cavity, said member having an outer surface and a transverse cross-sectional dimension less than the corresponding transverse cross-sectional dimension of said cavity such that the separated outer surface of said member and inner surface of said housing form said second chamber, whereby an increase in fluid pressure in said first chamber causes said piston to deform said member into said second chamber.

2. A pressure equalizing and shock absorbing device as described in claim 1 wherein said housing is comprised of a main housing member cooperating with said piston to form said first chamber and a cup-like end cap member secured thereto and forming said opposite wall; valve means at one end of said main housing member communicating with said first chamber and movable from a closed to an open position to bleed air from said first chamber; and integral cooling fins spaced apart on the outside of said main housing member and said end cap member.

3. A pressure equalizing and shock absorbing device as described in claim 1 wherein said resiliently yieldable member is made from a solid piece of elastomeric material having a hardness rating of around 65 shores.

4. A pressure equalizing and shock-absorbing device as described in claim 1 wherein said resiliently yieldable member is a solid piece of molded elastomeric material having a cylindrical end portion at one end adjacent said piston and a frusto-conical portion extending from said cylindrical portion and tapering to a smaller diameter within said second chamber.

5. A pressure equalizing and shock absorbing device as described in claim 1 including a quantity of fluid and a quantity of inert gas or air within said space of said second chamber surrounding said yieldable member.

6. A pressure equalizing and shock absorbing device as described in claim 1 including means for maintaining the axial alignment of said piston with said yieldable member within said housing.

7. A pressure equalizing and shock absorbing device as described in claim 6 wherein said means for maintaining axial alignment comprises axial aligned knob-like projections on the opposite ends of said yieldable member and recesses in one end of said piston and in said housing for receiving said projections.

8. A pressure equalizing and shock absorbing device as described in claim 1 wherein said piston has a cylindrical body portion having said first end and an enlarged flange portion integral with said body portion and having a face defining said second end of said piston, said face engaging one end surface of said yieldable member.

9. A pressure equalizing and shock absorbing device as described in claim 8 including an annular groove on said piston body portion spaced from said first end, and an O-ring disposed in said groove to provide a fluid tight seal between said piston and said housing.

10. A pressure equalizing device adapted for use in a hydraulic brake system of a vehicle having a central power source and actuators interconnected by a fluid pressure conduit, said device comprising;

a housing having a first chamber and an enclosed fluidtight second chamber interconnected by a cylindrical bore having a diameter smaller than said second chamber, said first chamber having inlet and outlet ports extending through the wall of said housing to provide means for receiving end portions of said conduit of said system to allow fluid under pressure to flow through said first chamber;

a movable piston having a main body portion located within said cylindrical bore with one end being exposed to the fluid pressure within said first chamber, said piston having an enlarged end portion extending from said main body portion and located in said second chamber;

an elongated, resiliently yieldable member in said second chamber having one end portion engaged with said enlarged end portion of said piston and extending therefrom to contact an opposite end wall of said second chamber, said yieldable member having a smaller volume than said second chamber so that an annular space is provided around it within said second chamber;

a noncompressible liquid material partially filling said annular space with the remaining portion of said space being filled with a compressible gas or air; whereby said second chamber can accommodate distortion of the yieldable member when increased fluid pressure occurs in said first chamber and thereby creates a force against said end face of said piston causing it to press against and distort said yieldable member and to compress said gaseous material in said annular space.

* * * * *